US011777990B2

(12) United States Patent
Kursun

(10) Patent No.: US 11,777,990 B2
(45) Date of Patent: Oct. 3, 2023

(54) MACHINE LEARNING-BASED EVENT ANALYSIS FOR CUSTOMIZED CONTRACT GENERATION AND NEGOTIATION IN ENHANCED SECURITY PEER-TO-PEER INTERACTION APPLICATIONS

(71) Applicant: BANK OF AMERICA CORPORATION, Charlotte, NC (US)

(72) Inventor: Eren Kursun, New York City, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 613 days.

(21) Appl. No.: 16/706,547

(22) Filed: Dec. 6, 2019

(65) Prior Publication Data
US 2021/0176276 A1 Jun. 10, 2021

(51) Int. Cl.
*H04L 9/40* (2022.01)
*H04L 67/1074* (2022.01)
*G06F 40/253* (2020.01)
*G06F 40/30* (2020.01)
*G06N 20/00* (2019.01)

(52) U.S. Cl.
CPC .......... *H04L 63/166* (2013.01); *G06F 40/253* (2020.01); *G06F 40/30* (2020.01); *G06N 20/00* (2019.01); *H04L 67/1078* (2013.01)

(58) Field of Classification Search
CPC ...... G06Q 10/06; G06Q 50/18; G06F 40/253; G06F 40/30; G06N 20/00; H04L 63/166; H04L 63/04; H04L 67/1078
USPC .......................................................... 726/3
See application file for complete search history.

(56) References Cited

U.S. PATENT DOCUMENTS

| 2016/0094653 A1* | 3/2016 | Balasubramanian ........................ H04L 67/1057 709/217 |
| 2016/0232631 A1* | 8/2016 | Young .................. G06Q 50/182 |
| 2018/0174164 A1* | 6/2018 | B .......................... G06N 5/025 |
| 2018/0322396 A1* | 11/2018 | Ahuja-Cogny ........ G06N 5/022 |
| 2019/0340684 A1* | 11/2019 | Belanger ................ G06N 7/005 |
| 2019/0340715 A1* | 11/2019 | Celia ...................... G06F 9/466 |

\* cited by examiner

*Primary Examiner* — Mohamed A. Wasel
*Assistant Examiner* — John Fan
(74) *Attorney, Agent, or Firm* — Moore & Van Allen PLLC; R. W. McCord Rayburn

(57) ABSTRACT

A system for machine learning-derived contract generation is provided. The system comprises: a machine learning engine and a controller configured to: input historical and streaming interaction data into the machine learning engine, wherein the machine learning engine is trained by the historical and streaming interaction data; determine one or more machine learning-derived interaction patterns for a resource transfer between the first user device and the second user device, wherein the one or more machine learning-derived interaction patterns comprise calculated exposure levels for one or more events for completing the resource transfer; based on the machine learning-derived interaction patterns, generate the resource transfer contract for transferring a resource from the first user device to the second user device, wherein the resource transfer contract comprises a sequential flow of the one or more events; and distribute the resource transfer contract to the first user device and the second user device.

15 Claims, 12 Drawing Sheets

```
                                                                                    800
                                                                                     ↘

┌─────────────────────────────────────────────────────────────────────────────────────┐
│ DATA FROM HISTORICAL RESOURCE TRANSFERS (E.G., RESOURCE AMOUNTS, TYPES, USERS INVOVLED, ETC.) │
│              BETWEEN USERS ACROSS ALL CHANNELS IS INPUTTED TO THE SYSTEM            │
│                                         810                                         │
└─────────────────────────────────────────────────────────────────────────────────────┘
                                          ↓
┌─────────────────────────────────────────────────────────────────────────────────────┐
│  MISAPPROPRIATION RATE OF THE INDIVIDUAL PARTY, MISAPPROPRIATION RATE FOR RESOURCE TRANSFER │
│                  TYPE, GEOGRAPHIC LOCATION, AND OTHER FACTORS INPUTTED              │
│                                         820                                         │
└─────────────────────────────────────────────────────────────────────────────────────┘
                                          ↓
┌─────────────────────────────────────────────────────────────────────────────────────┐
│    RESOURCE TRANSFER TYPE (E.G., SPECIFIC RESOURCES, RESOURCE TYPES AND FORMATS, ETC.) RECEIVED/ │
│                                      INPUTTED                                       │
│                                         830                                         │
└─────────────────────────────────────────────────────────────────────────────────────┘
                                          ↓
┌─────────────────────────────────────────────────────────────────────────────────────┐
│ LABELED DATA FROM HISTORICAL AND RECENT MISAPPROPRIATION CASES AND TACTICS INPUTTED (E.G., FROM │
│                    CLAIMS, ALERT AND ANALYST PROCESSES, REPORT LOGS ETC.).          │
│                                         840                                         │
└─────────────────────────────────────────────────────────────────────────────────────┘
                                          ↓
┌─────────────────────────────────────────────────────────────────────────────────────┐
│ LOG FILES FOR MISAPPROPRIATION ENTRIES ARE ANALYZED THROUGH NATURAL LANGUAGE PROCESSING TO │
│  DETERMINE BREAKING POINTS (E.G., WRONG RESOURCE DELIVERY, NO RESOURCE DELIVERY, RESOURCE │
│              CONTRACTED TO MORE THAN ONE OTHER USER, DEFECTIVE OR MISREPRESENTED RESOURCE, ETC.) │
│                                         850                                         │
└─────────────────────────────────────────────────────────────────────────────────────┘
                                          ↓
┌─────────────────────────────────────────────────────────────────────────────────────┐
│    MACHINE LEARNING MODEL IS TRAINED USING THE RESOURCE TRANSFER DATA, EVENT DATA, USER AND │
│ MISAPPROPRIATION PROFILES, LABELED DATA AND LOG FILES (WITH BOTH RECENT AND HISTORICAL ENTRIES) │
│                                         860                                         │
└─────────────────────────────────────────────────────────────────────────────────────┘
                                          ↓
┌─────────────────────────────────────────────────────────────────────────────────────┐
│  MACHINE LEARNING MODEL (i) PROVIDES PREDICTION FOR THE OVERALL RESOURCE TRANSFER IN TERMS OF │
│  MISAPPROPRIATION POTENTIAL, AND (ii) OUTPUTS KEY STAGES THAT REQUIRE PROTECTION/CONFIRMATION FOR │
│                      MISAPPROPRIATION POTENTIAL (E.G., DELIVERY ETC.)               │
│                                         870                                         │
└─────────────────────────────────────────────────────────────────────────────────────┘
                                          ↓
┌─────────────────────────────────────────────────────────────────────────────────────┐
│ RESULTING OUTPUTS ARE ANALYZED AND CLUSTERED BASED ON MAIN CHARACTERISTICS, SUCH AS EXPOSURE │
│        LEVELS, MISAPPROPRIATION LEVELS, RESOURCE TRANSFER TYPE, RESOURCE TRANSFER AMOUNT, ETC. │
│                                         880                                         │
└─────────────────────────────────────────────────────────────────────────────────────┘
                                          ↓
┌─────────────────────────────────────────────────────────────────────────────────────┐
│  A TEMPLATE IS CREATED COMBINING THE MACHINE LEARNING OUTPUT FOR THE RESOURCE TRANSFER DATA │
│      (TYPE, AMOUNT, USERS, EXPOSURE LEVELS, ETC.) WITH REQUIRED STEPS TO SECURE THE PROCESS │
│                                         890                                         │
└─────────────────────────────────────────────────────────────────────────────────────┘
```

*FIG. 8*

```
┌─────────────────────────────────────────────────────────────────────────────┐
│ IN THE EVENT OF CUSTOM P2P CONTRACT EXECUTION, EACH USER AGREES ON THE FINAL│
│ CONTRACT, AND THE FINAL CODIFIED CONTRACT IS DISTRIBUTED TO ALL INVOLVED    │
│ USERS                                                                       │
│ 1010                                                                        │
└─────────────────────────────────────────────────────────────────────────────┘
                                      ↓
┌─────────────────────────────────────────────────────────────────────────────┐
│ IN EACH STEP, CHECKS ARE MADE AS TO IF THE STAGE IS COMPLETED OR NOT (E.G., │
│ BARCODE OF THE DELIVERY SHIPMENT IS SCANNED ETC.)                           │
│ 1020                                                                        │
└─────────────────────────────────────────────────────────────────────────────┘
                                      ↓
┌─────────────────────────────────────────────────────────────────────────────┐
│ EACH COMPLETED STEP GENERATES A NOTIFICATION FOR ALL THE USERS INVOLVED. IN │
│ SOME EMBODIMENTS, USERS MAY BE ASKED TO PROVIDE SUPPORTING DATA FOR STEPS   │
│ 1030                                                                        │
└─────────────────────────────────────────────────────────────────────────────┘
                                      ↓
┌─────────────────────────────────────────────────────────────────────────────┐
│ WHEN A PREDETERMINED SET OF STEPS ARE COMPLETED, THE RESOURCES TO BE        │
│ TRANSFERRED ARE MOVED TO A TEMPORARY STORAGE LOCATION BEFORE THE FINAL      │
│ EXECUTION OF THE TRANSFER                                                   │
│ 1040                                                                        │
└─────────────────────────────────────────────────────────────────────────────┘
                                      ↓
┌─────────────────────────────────────────────────────────────────────────────┐
│ IN THE EVENT THAT STEPS ARE NOT AGREED UPON, CONFLICT RESOLUTION ASPECTS OF │
│ THE CONTRACT ARE ACTIVATED. THIRD PARTY INPUT OR OTHER FORMS OF INPUT ARE   │
│ SOUGHT.                                                                     │
│ 1050                                                                        │
└─────────────────────────────────────────────────────────────────────────────┘
                                      ↓
┌─────────────────────────────────────────────────────────────────────────────┐
│ WHEN ALL STEPS IN THE P2P CONTRACT ARE COMPLETED, THE TRANSFER IS AGREED AS │
│ COMPLETED                                                                   │
│ 1060                                                                        │
└─────────────────────────────────────────────────────────────────────────────┘
                                      ↓
┌─────────────────────────────────────────────────────────────────────────────┐
│ ANY SHADOW PROCESSES SUCH AS RESOURCE RELEASES/TRANSFERS, CLAIM SUBMISSIONS,│
│ MISAPPROPRIATION ALERTS, ARE AUTOMATICALLY PROCESSED BY THE BACK-END OF THE │
│ SYSTEM.                                                                     │
│ 1070                                                                        │
└─────────────────────────────────────────────────────────────────────────────┘
                                      ↓
┌─────────────────────────────────────────────────────────────────────────────┐
│ IN THE EVENT OF IDENTIFIED MISAPPROPRIATION, ASSOCIATED USERS ARE MARKED IN │
│ THE SYSTEMS WITH THE REPORTED CLAIMS. CORRESPONDING MISAPPROPRIATION        │
│ EXPOSURE SCORES FOR ANY FOLLOWING RESOURCE TRANSFERS ARE CHANGED ACCORDING  │
│ TO THE LEARNED EXPOSURE FROM THIS AND PREVIOUS TRANSFERS.                   │
│ 1080                                                                        │
└─────────────────────────────────────────────────────────────────────────────┘
```

FIG. 10

MACHINE LEARNING-BASED EVENT ANALYSIS FOR CUSTOMIZED CONTRACT GENERATION AND NEGOTIATION IN ENHANCED SECURITY PEER-TO-PEER INTERACTION APPLICATIONS

BACKGROUND

Resource transfers, such as peer-to-peer resource transfers, have grown in popularity in recent years. One of the greatest challenges in peer-to-peer systems is the fact that the users are advised to execute transfers with only those that they know and trust. Even though peer-to-peer systems enable seamless resource transfer capabilities in a mobile space, the security aspect has been the main obstacle for not being further implemented in larger-scale and/or sensitive interactions. Due to the ease, speed, and finality of the interactions involved, peer-to-peer resource transfers may be subject to misappropriation attempts. For example, there are a number of misappropriation cases where a user causes another user to believe that they are transferring valid resources while they also propose the resource transfer to many other users. As such, there exists a need for an improved resource transfer system for generating customizable resource transfers with contract-executed, event-based tracking for improved resource transfer security and confirmation.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for machine learning-derived contract generation is provided. The system comprises: a machine learning engine; and a controller configured for generating a resource transfer contract between a first user device and a second user device, the controller comprising a memory device with computer-readable program code stored thereon, a communication device connected to a network, and a processing device, wherein the processing device is configured to execute the computer-readable program code to: input historical and streaming interaction data into the machine learning engine, wherein the machine learning engine is trained by the historical and streaming interaction data; determine one or more machine learning-derived interaction patterns for a resource transfer between the first user device and the second user device, wherein the one or more machine learning-derived interaction patterns comprise calculated exposure levels for one or more events for completing the resource transfer; based on the machine learning-derived interaction patterns, generate the resource transfer contract for transferring a resource from the first user device to the second user device, wherein the resource transfer contract comprises a sequential flow of the one or more events; and distribute the resource transfer contract to the first user device and the second user device.

In one embodiment, the processing device is further configured to execute the computer-readable program code to: calculate an exposure level for each of the one or more events of the resource transfer contract based on the interaction patterns; identify that the exposure level for at least one of the one or more events exceeds a predetermined threshold; and based on the exposure level exceeding the predetermined threshold, modify the sequential flow of the one or more events, wherein modifying the sequential flow of the one or more events comprises inserting an additional security event to the sequential flow.

In another embodiment, the processing device is further configured to execute the computer-readable program code to: receive a modification to the sequential flow of the one or more events from at least one of the first user device and the second user device; generate a modified resource transfer contract based on the modification; and calculate a modified exposure level for the modified resource transfer contract, wherein the one or more events and the modification are input into the machine learning engine.

In yet another embodiment, the processing device is further configured to execute the computer-readable program code to iteratively modify the sequential flow of the one or more events until the modified exposure score is below a predetermined threshold limit. In yet another embodiment, the processing device is further configured to execute the computer-readable program code to terminate the resource transfer contract when the modified exposure level exceeds a predetermined threshold limit.

In yet another embodiment, the historical and streaming interaction data comprises one or more of the group consisting of resource data, a resource transfer type, user data of the first user and the second user, historical resource transfer data, and historical misappropriation data. In yet another embodiment, the historical misappropriation data further comprises previously identified misappropriation interactions and unauthorized user logs.

In yet another embodiment, the machine learning engine further comprises a natural language processing module configured to determine the one or more machine learning-derived interaction patterns for the resource transfer based on the historical and streaming interaction data.

In yet another embodiment, the resource transfer contract is an executable tracking module, and wherein the processing device is configured to execute the computer-readable program code to install the executable module on the first user device and the second user device, and wherein the executable tracking module is configured to track completion of the one or more events A system for natural language processing-enhanced resource transfer contract security is provided. The system comprises: a machine learning engine comprising a natural language processing module; and a controller configured for securely customizing a resource transfer contract between a first user device and a second user device, the controller comprising a memory device with computer-readable program code stored thereon, a communication device connected to a network, and a processing device, wherein the processing device is configured to execute the computer-readable program code to: input misappropriation interaction data into the natural language processing module, wherein the natural language processing module is trained by the misappropriation interaction data; extract one or more keyword identifiers from the misappropriation interaction data, wherein the one or more keyword identifiers are associated with misappropriation interactions; based on the one or more identifiers, calculate an exposure level for the resource transfer contract; compare the exposure level of the resource transfer contract to a predetermined exposure threshold level; and based on the exposure level of the resource transfer contract not exceeding the predetermined exposure threshold level, distribute the resource transfer contract to the first user device and the second user device.

In one embodiment, the resource transfer contract comprises a sequential flow of one or more events, and wherein the processing device is further configured to execute the computer-readable program code to: calculate an individual exposure level for each of the one or more events of the resource transfer contract based on the interaction patterns; identify that the individual exposure level for at least one of the one or more events exceeds the predetermined exposure threshold level; and based on the individual exposure level exceeding the predetermined exposure threshold level, modify the sequential flow of the one or more events, wherein modifying the sequential flow of the one or more events comprises inserting an additional security event to the sequential flow.

In another embodiment, the processing device is further configured to execute the computer-readable program code to iteratively modify the sequential flow of the one or more events until the exposure level for the resource transfer contract is below the predetermined exposure threshold level.

In yet another embodiment, the keyword identifier comprises at least one of vocabulary, syntax, semantics, grammar, and word frequency patterns. In yet another embodiment, the misappropriation interaction data comprises historical and streaming data.

A computer-implemented method for or machine learning-derived contract generation is also provided. The computer-implemented method comprises: inputting historical and streaming interaction data into the machine learning engine, wherein the machine learning engine is trained by the historical and streaming interaction data; determining one or more machine learning-derived interaction patterns for a resource transfer between a first user device and a second user device, wherein the one or more machine learning-derived interaction patterns comprise calculated exposure levels for one or more events for completing the resource transfer; based on the machine learning-derived interaction patterns, generating the resource transfer contract for transferring a resource from the first user device to the second user device, wherein the resource transfer contract comprises a sequential flow of the one or more events; and distributing the resource transfer contract to the first user device and the second user device.

In one embodiment, the method further comprises: calculating an exposure level for each of the one or more events of the resource transfer contract based on the interaction patterns; identifying that the exposure level for at least one of the one or more events exceeds a predetermined threshold; and based on the exposure level exceeding the predetermined threshold, modifying the sequential flow of the one or more events, wherein modifying the sequential flow of the one or more events comprises inserting an additional security event to the sequential flow.

In another embodiment, the method further comprises: receiving a modification to the sequential flow of the one or more events from at least one of the first user device and the second user device; generating a modified resource transfer contract based on the modification; and calculating a modified exposure level for the modified resource transfer contract, wherein the one or more events and the modification are input into the machine learning engine.

In yet another embodiment, the method further comprises iteratively modifying the sequential flow of the one or more events until the modified exposure score is below a predetermined threshold limit. In yet another embodiment, the method further comprises terminating the resource transfer contract when the modified exposure level exceeds a predetermined threshold limit.

In yet another embodiment, the historical and streaming interaction data comprises one or more of the group consisting of resource data, a resource transfer type, user data of the first user and the second user, historical resource transfer data, and historical misappropriation data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
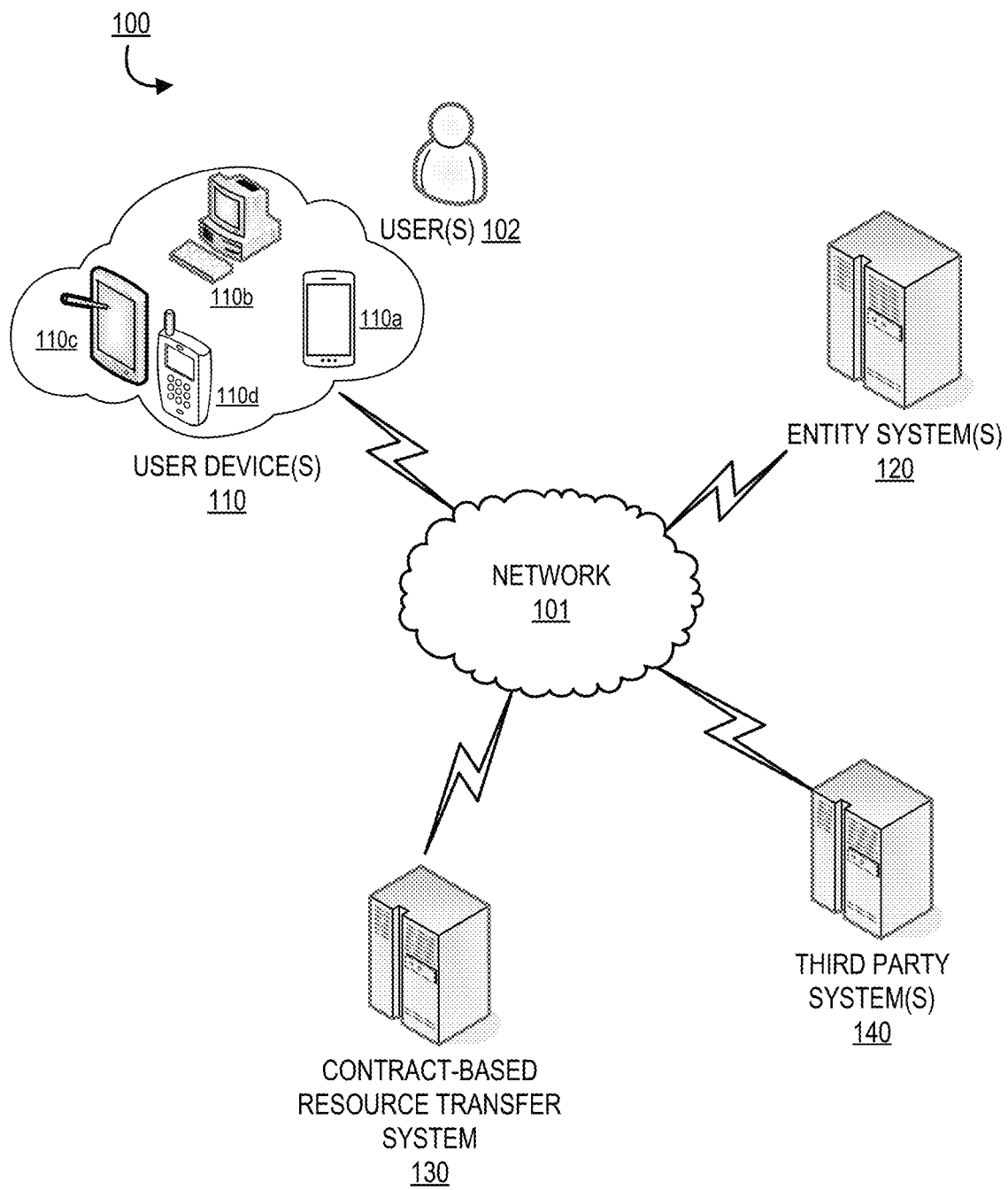
Figure 2:
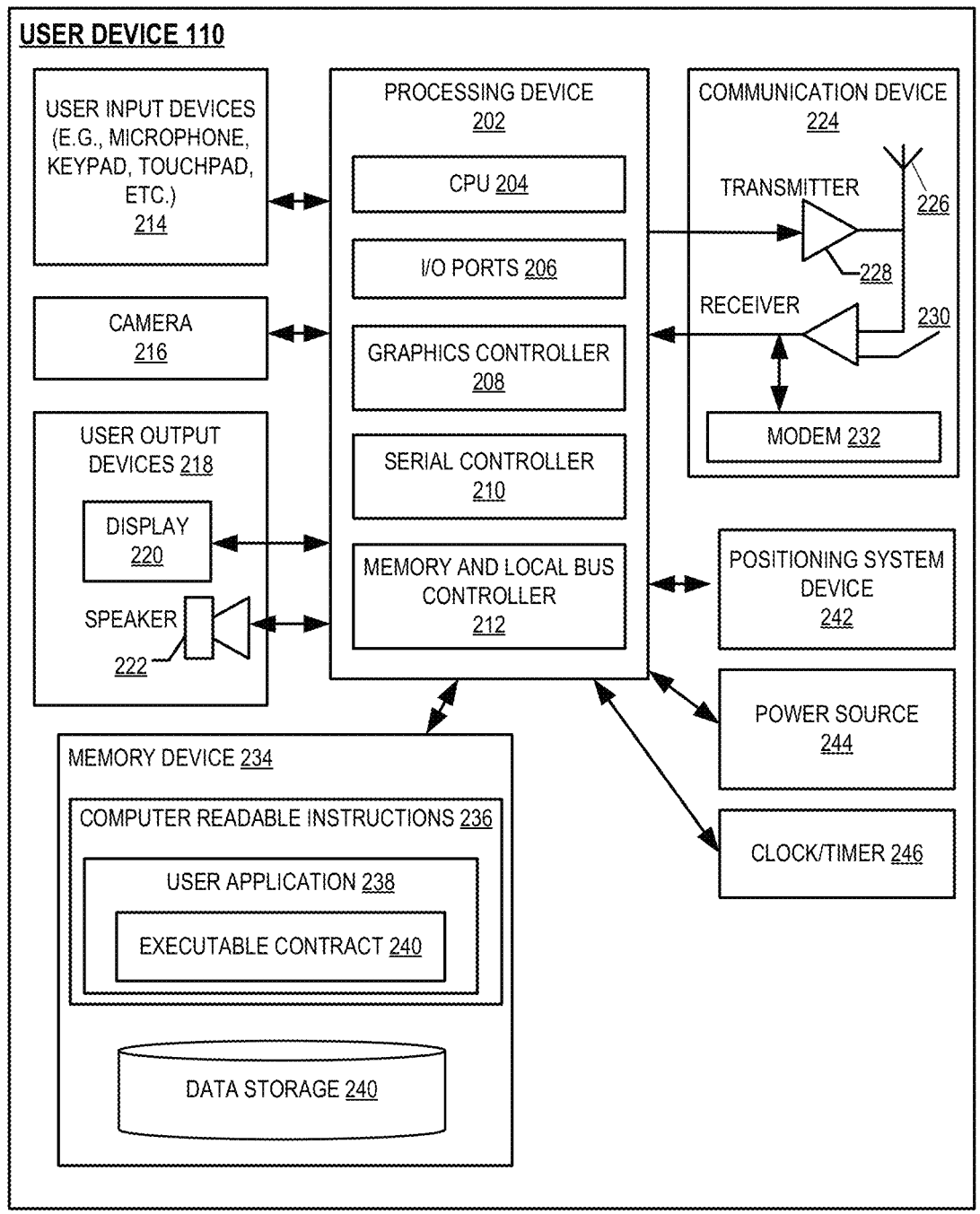
Figure 3:
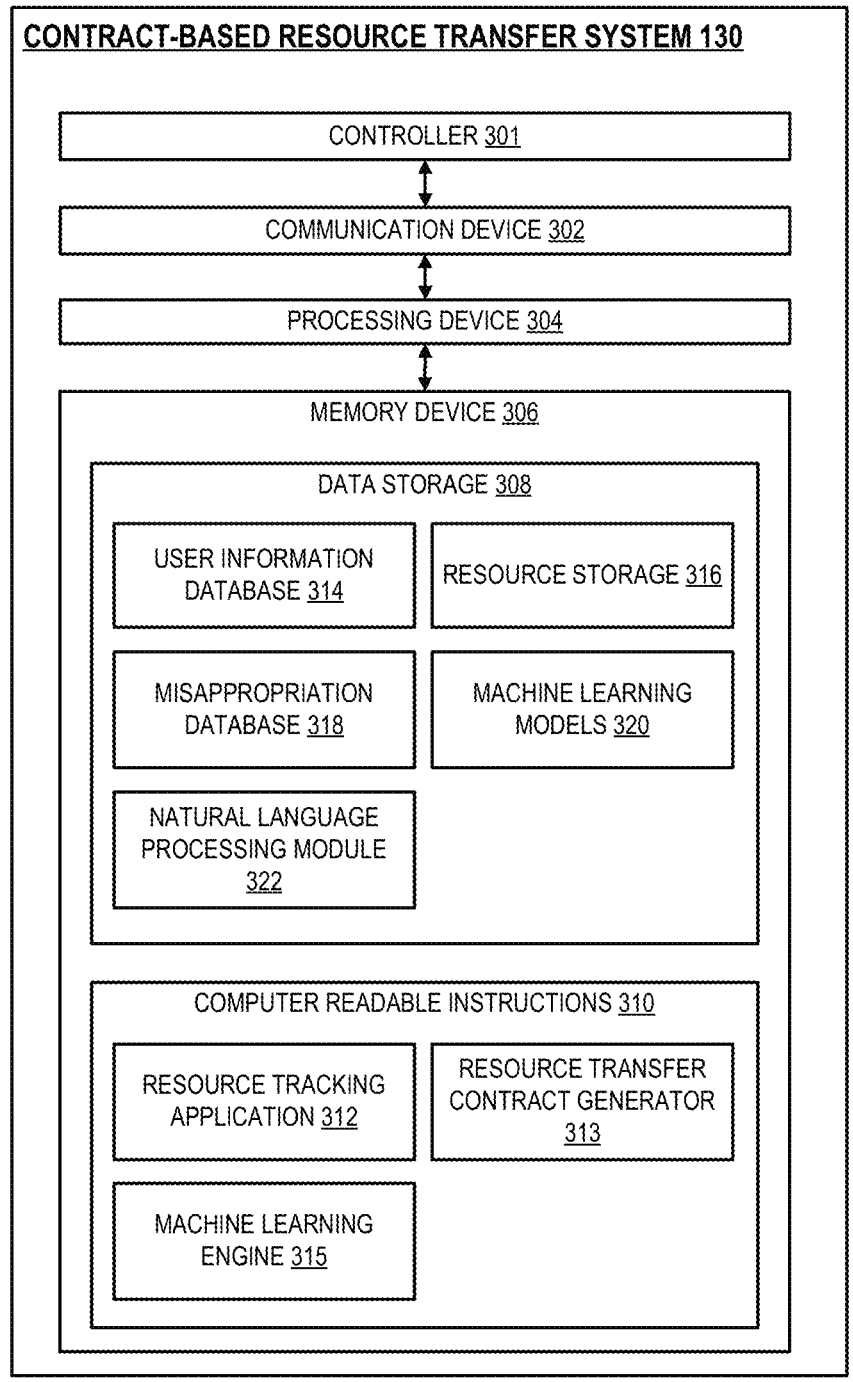
Figure 4:
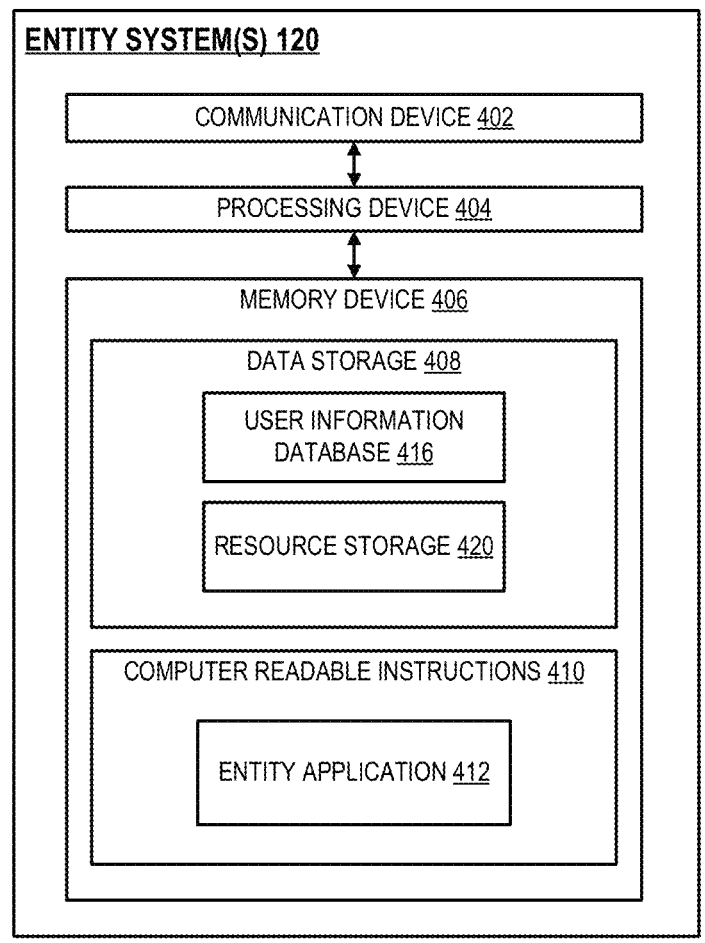
Figure 5:
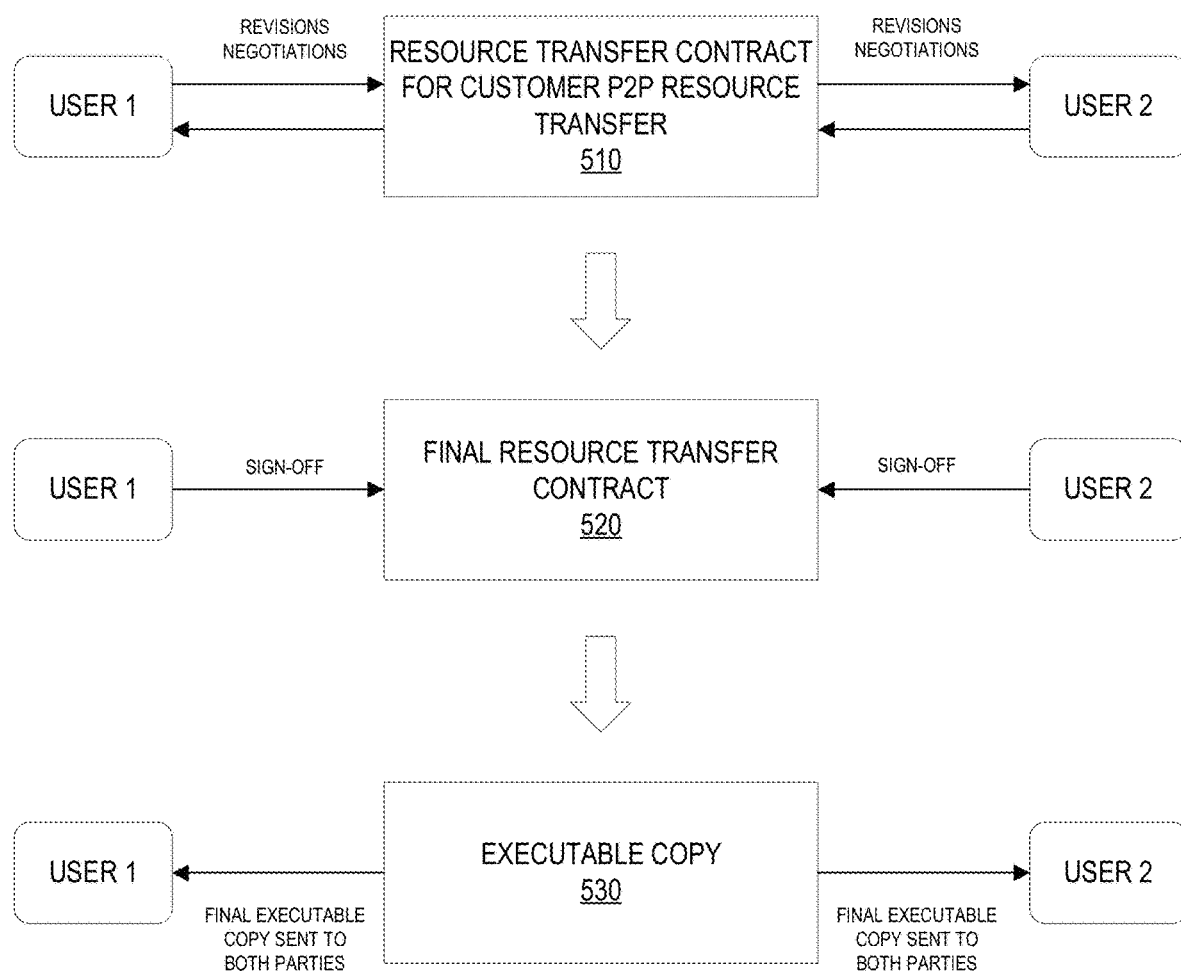
Figure 6:
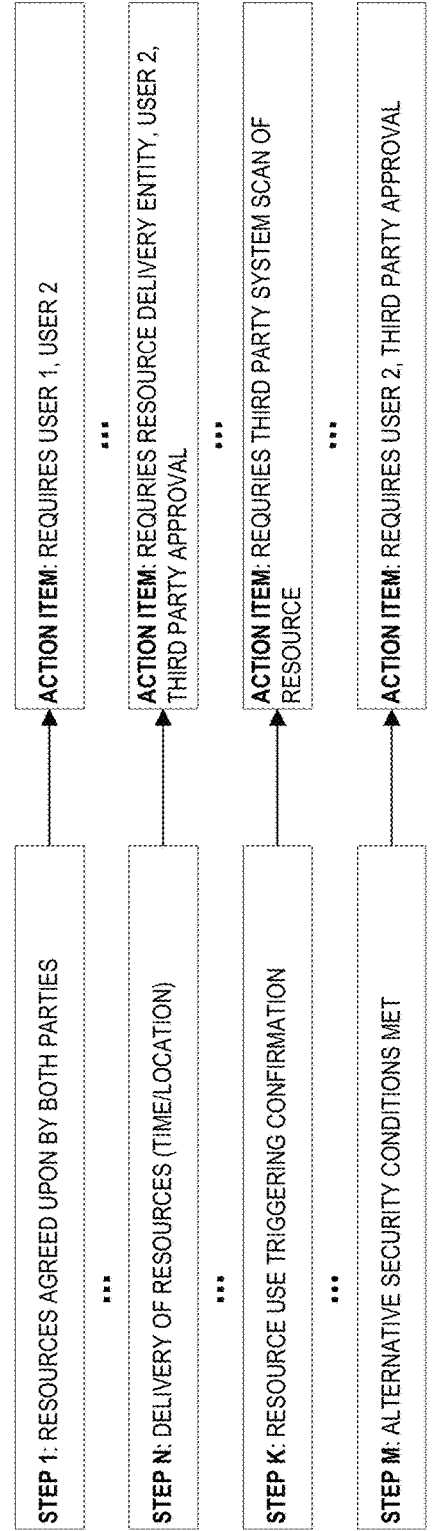
Figure 7:
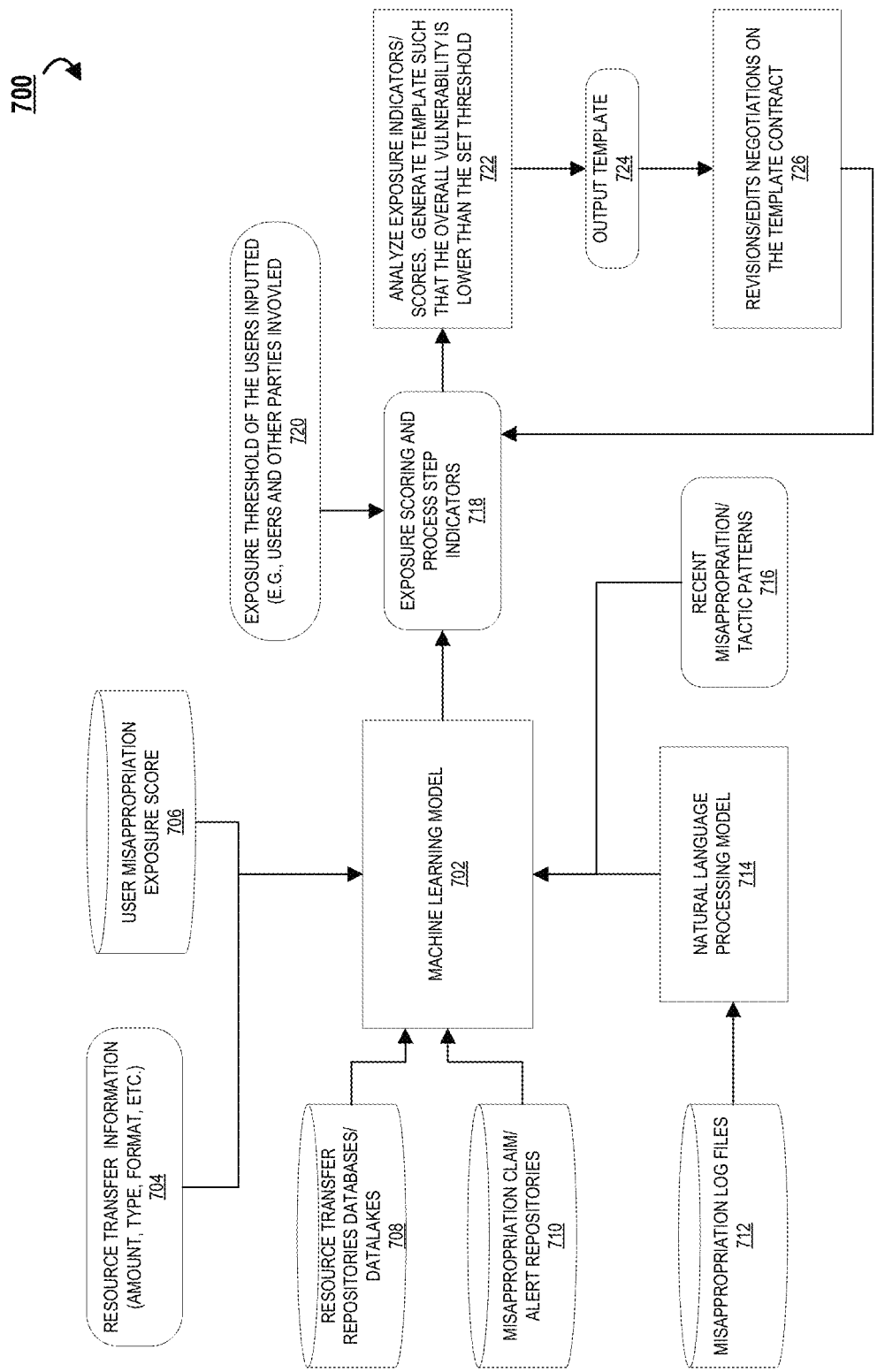
Figure 9:
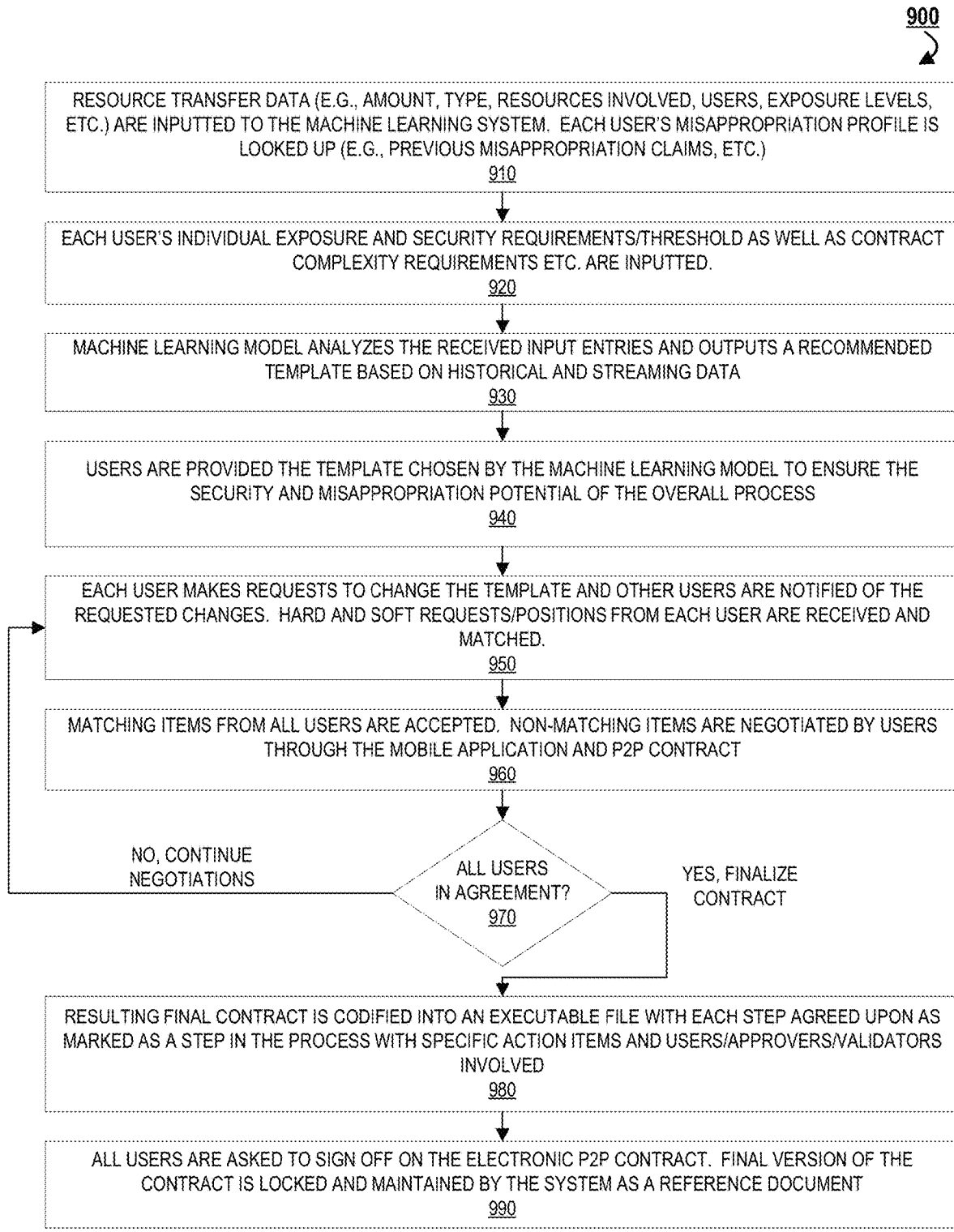
Figure 11:
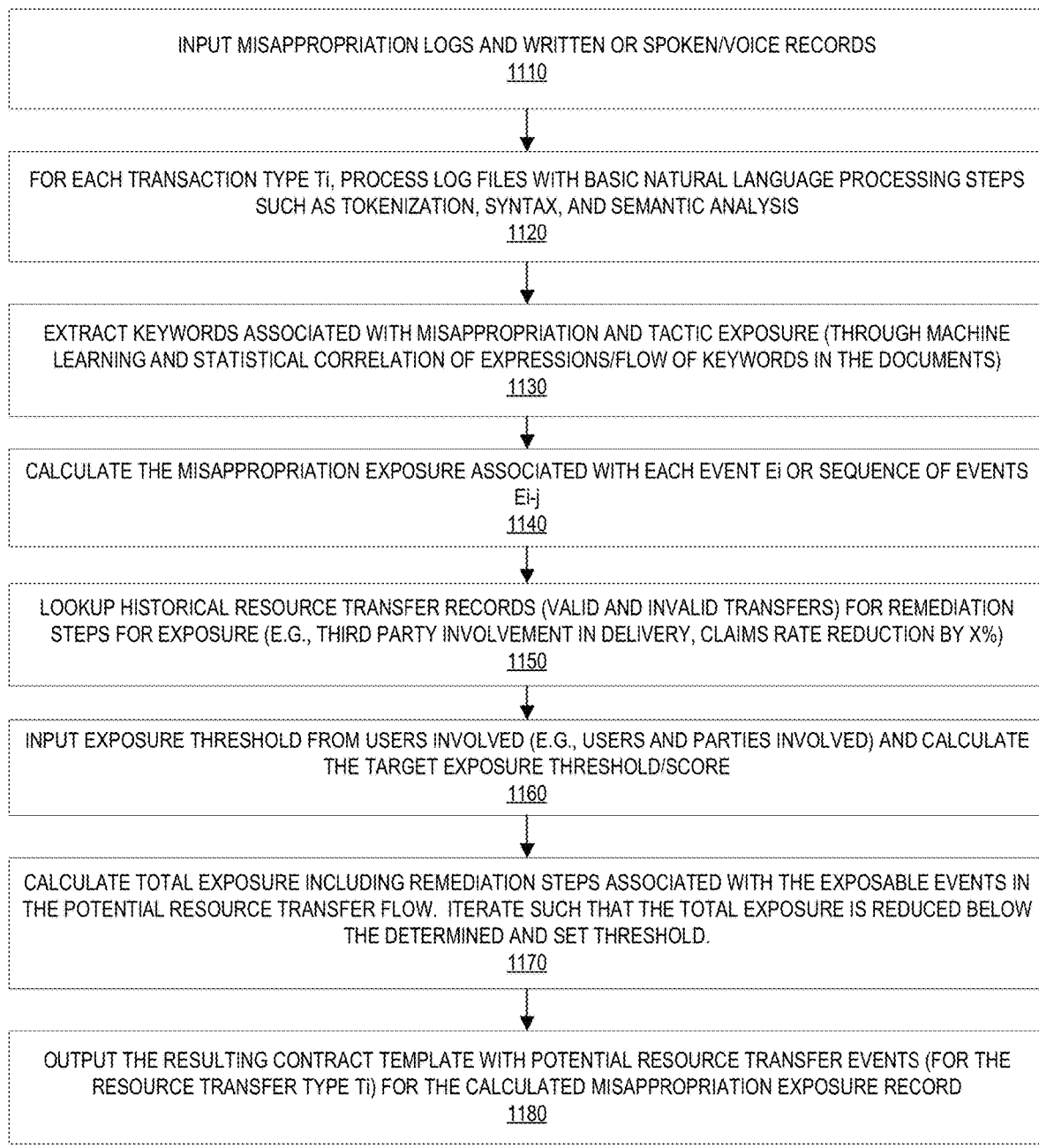
Figure 12:
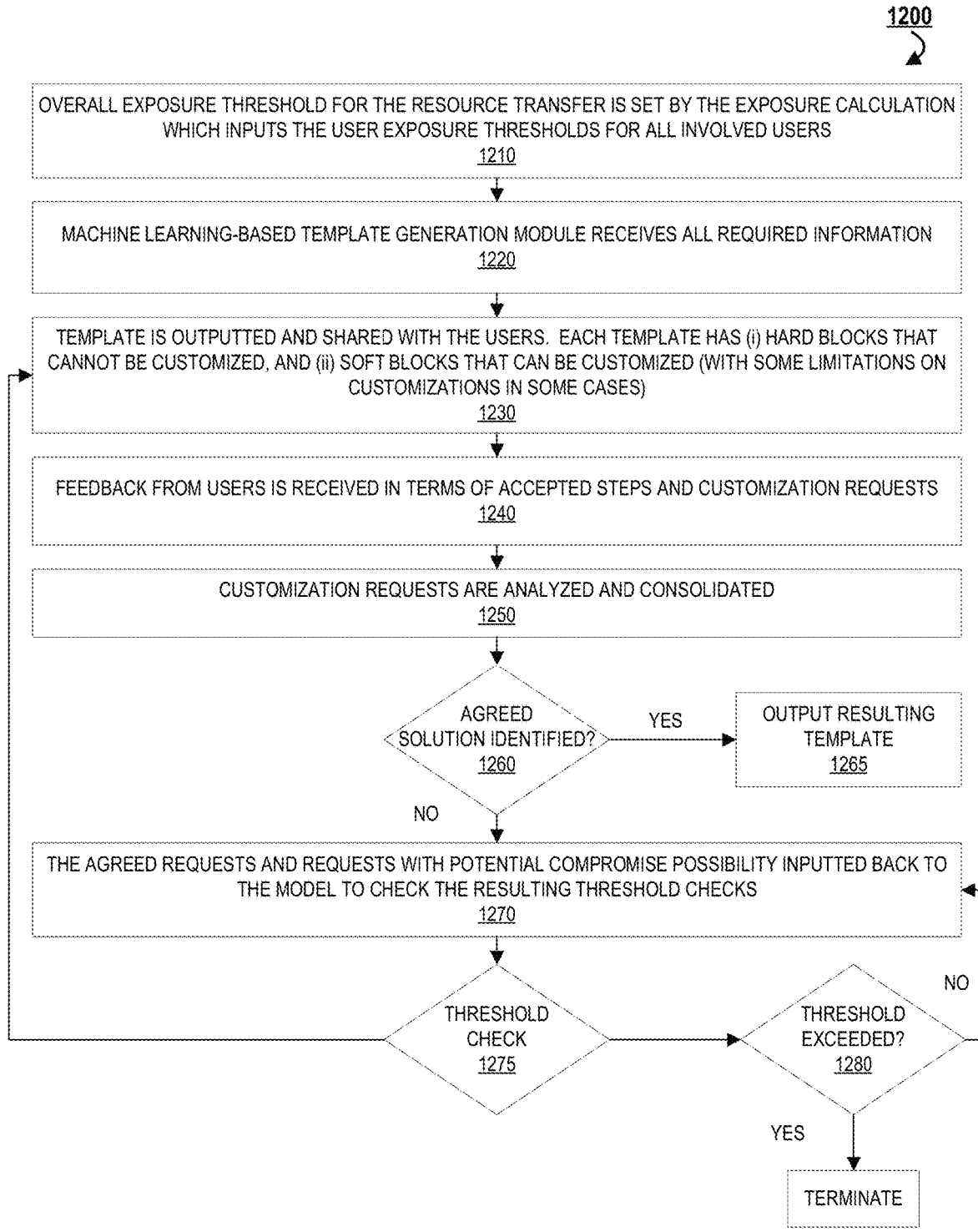

Having thus described embodiments of the invention in general terms, reference will now be made to the accompanying drawings, wherein:

FIG. 1 provides a contract-based resource transfer system environment, in accordance with one embodiment of the invention;

FIG. 2 provides a block diagram of a user device, in accordance with one embodiment of the invention;

FIG. 3 provides a block diagram of an contract-based resource system, in accordance with one embodiment of the invention;

FIG. 4 provides a block diagram of an entity system, in accordance with one embodiment of the invention;

FIG. 5 provides a high level process flow for contract-based resource transfer generation, in accordance with one embodiment of the invention;

FIG. 6 provides a process diagram of an exemplary contract execution, in accordance with one embodiment of the invention;

FIG. 7 provides a machine learning contract template generator system environment, in accordance with one embodiment of the invention;

FIG. 8 provides a high level process flow for machine learning training and contract template generation, in accordance with one embodiment of the invention;

FIG. 9 provides a high level process flow for contract template customization and finalization, in accordance with one embodiment of the invention;

FIG. 10 provides a high level process flow for peer-to-peer resource transfer execution, in accordance with one embodiment of the invention;

FIG. 11 provides a high level process flow for natural language processing exposure event extraction, in accordance with one embodiment of the invention; and FIG. 12 provides a high level process flow for exposure-based contract modification, in accordance with one embodiment of the invention.

DETAILED DESCRIPTION OF EMBODIMENTS OF THE INVENTION

Embodiments of the invention, as described herein, leverage complex, specific-use computer system to provide a novel approach for generating and executing customizable contract-based resource transfers for improved resource transfer security and delivery confirmation. The system of the present invention is configured to generate resource transfers between users and/or devices (e.g., a peer-to-peer interaction) comprising conditions of the transfer as well as one or more events that may trigger processes, steps, or actions contained in the contract, such as a final transfer of the resource between parties.

The system enables a contract generation process wherein participants customize and agree on details and conditions of a resource transfer from predetermined and/or learned or recommended options. Conditions of a resource transfer may include, for example a delivery of goods, transfer conditions, transfer terms, a transfer amount, a date and location on which the resource transfer or one or more steps or events of the resource transfers are required to be completed, and the like. The conditions and triggering events established in the resource transfer contract generated by the system are mutually agreed upon by all parties involved in the transfer before the transfer is initiated. Defined conditions and triggering events for resource transfers may be defined or modified based on, for example, the type or amount of a resource to be transferred, the users and/or user devices participating in the transfer, or the like. Embodiments of the invention may further include an exposure scoring component, wherein individual events may be dynamically tailored for a customized resource transfer based on the security requirements and potential for exposure.

In some embodiments, the system may generate a sequential flow of events that must be completed in order to successfully trigger a transfer of a resource and complete the resource transfer. These chains of events may be used to track the status of complex resource transfers and identify points of failure in event flows. The system is further configured to cancel a resource transfer after determining a failure to successfully execute a required event or meet a condition, wherein resources are released back to an original resource location (e.g., an originating user and/or user device). In each of the stages of the agreed upon resource transfer protocol, each user may be required to add supporting data or documents, such as shipment receipts, delivery notifications, or the like. Similarly, independent third parties may be involved to ensure and verify that the resource or any other goods or services have been delivered (e.g., tickets have been scanned, a movie or concert entrance happened (i.e., tickets were used), etc.).

Furthermore, the system provides a conflict resolution module incorporating third party verification and authentication in the event of a disputed event. The conflict resolution module may include additional delivery conditions or triggering events as well as contract cancelation and resource return conditions. In the event of conflicts, a process is agreed upon to resolve the conflict which may require third party involvement (e.g., third party verification).

The described system can be provided as a custom service for high-end peer-to-peer or large-scale entity (i.e., entity-to-entity) interactions. This process requires both parties to start with an initial contract template based on a resource type and customize the process with agreed upon steps and additional parties. Following an agreement on the final contract, the contract is translated into an executable file that is installed on the devices of the involved users (e.g., in a mobile device application in which the protocol is embedded). The invention is configured to codify a resource transfer contract into an executable file format that is installed on the participating user devices and that runs as a distributed peer-to-peer protocol agreed upon by all parties involved at the beginning of the interaction. The executable file specifies what exact steps will need to take place, at what exact dates/times, what parties need to approve the process steps completion, what conditions are required for a complete resource transfer, what conditions are required for resource return or contract termination, or the like.

As the steps are completed, the resource transfers, claims, and other automatic steps are completed in the background. The backend of the proposed solution includes collecting signals or notifications from all the authorized parties and devices at the specified steps of the process. For instance, if a delivery company is required to report the completion of the delivery of a resource, there is an API (application programming interface) configured to receive the information on the back-end system via communication with one or more other systems (e.g., third party systems).

In contrast to the present invention, current peer-to-peer resource transfer methods lack reliable tools for tracking and confirming delivery of resources for both involved parties leading to the increased potential for exposure and misappropriation. Instead, the present solution provides significant advantages over current peer-to-peer interactions or resource transfers. Due to the pre-determined agreement, both parties can agree on all of the details of the process before execution of the resource transfer. The underlying distributed protocol provides a level of confidence against potential exposure or misappropriation as the peer-to-peer resource transfer becomes more secure and conditional on various terms that protect both parties. Additionally, both parties have the option to customize the protocol based on the specific type of resource transfer, a potential exposure level of the interaction, an amount of a resource to be transferred, and the like. For example, a resource transfer for a first smaller resource amount for a basketball contest ticket may be treated very differently than a resource transfer for a second, larger resource amount for electronics. Even further, both of these examples may be different from an entity (e.g., a company) resource transfer for a third, even larger resource amount. In these examples within the invention, each interaction may have different event flows, different parties involved, different security requirements, and the like.

In some embodiments of the invention, the invention further leverages artificial intelligence and machine learning technology to determine and generate templates for contract negotiation and execution between users. A machine learning engine may be configured to receive data input such as a resource transfer type, a resource amount, a potential exposure or misappropriation level, an exposure appetite for the users involved, and the like to generate an appropriate template.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the contract-based resource transfer system described herein. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein data from an interaction between the user and another user and/or entity is monitored, analyzed, and/or processed by the system. In a specific embodiment, a user is a requestor of an interaction or transaction with another user or entity, wherein the user is attempting to transfer or exchange resources with another user or entity. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), automated teller machines (ATMs), or any combination of the aforementioned. The device may be used by the user to access the system directly or through an application, online portal, internet browser, virtual private network, or other connection channel.

As used herein, the term "entity" may be used to include any organization or collection of users that may interact with the contract-based resource transfer system. An entity may refer to a business, company, or other organization that either maintains or operates the system or requests use and accesses the system. In some embodiments, an entity may refer to a financial entity. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user and/or a user device. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with a device and/or account) and determine that the user has authority to access an account or system or otherwise execute an interaction. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transfer or exchange of resources (e.g., funds, data (i.e., files), goods, service, or the like) between users and/or devices either directly or via an intermediate system (e.g., an entity system and/or the contract-based resource transfer system described below). In a specific embodiment, an interaction may comprise a peer-to-peer transfer or exchange of resources at least partially executed over a network. In some embodiments, an interaction may additionally comprise an exchange of resource and/or physical goods or services.

FIG. 1 provides a contract-based resource transfer system environment 100, in accordance with one embodiment of the invention. As illustrated in FIG. 1, contract-based resource transfer system 130 is operatively coupled, via a network 101, to the user device(s) 110 (e.g., a plurality of user devices 110a-110d) and the entity system(s) 120. In this way, the contract-based resource transfer system 130 can send information to and receive information from the user device 110 and the entity system 120. In the illustrated embodiment, the plurality of user devices 110a-110d provide a plurality of communication channels through which the entity system 120 and/or the contract-based resource transfer system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 may further comprise a peer-to-peer communication network.

In some embodiments, the user 102 is an individual interacting with one or more entity systems 120 and/or other user devices via a user device 110 while a data stream or flow between the user device 110 and the entity system 120 and/or other user devices is intercepted and monitored by the contract-based resource transfer system 130 over the network 101. In some embodiments a user 102 is a user requesting service from the entity or interacting with an account maintained by the entity system 120. In an alternative embodiment, the user 102 is an individual interacting with the contract-based resource transfer system 130 over the network 101 and monitoring input of information from the entity systems 120 to and from the contract-based resource transfer system 130 for processing and analysis (e.g., an employee of the entity operating and/or monitoring the systems 120, 130). In another specific embodiment, the user 102 is an individual interacting with another user to complete an interaction or transaction between the two users (e.g., a peer-to-peer interaction). For example, the interaction may be executed between user devices 110 of the two users directly. In an alternative example, the interaction may be processed through another system such as entity system 120 and/or contract-based resource transfer system 130.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device or GPS device, an accelerometer, and the like. In one embodiment, the camera 216 may include a scanner, barcode reader, or any other image capturing device or sensor configured to capture an image or scan readable indicia (e.g., a barcode, label, or the like). The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user application 238 may be configured to allow a user 102 to request, initiate, and/or receive an interaction with another device or system. In some embodiments, the user application 238 is a resource transfer application, wherein the user application 238 is configured to allow a user to transfer, receive, or exchange, a resource with other user devices (e.g. via peer-to-peer interactions). In some embodiments, the memory device 234 may store information or data generated by the contract-based resource transfer system 130 and/or by the processes described herein. In a specific embodiment, the memory device 234, and more specifically the data storage 240, may be configured to store a resource used in interactions described herein.

The processing device 202 may be configured to use the communication device 224 to communicate with one or more other devices on a network 101 such as, but not limited to the entity system 120 and the contract-based resource transfer system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporary memory during use. As used herein, memory may include any computer readable medium configured to store data, code, or other information (e.g., an executable resource transfer contract). The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of a contract-based resource transfer system 130, in accordance with one embodiment of the invention. The contract-based resource transfer system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the contract-based resource transfer system 130, in order to interface, monitor, and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the contract-based resource transfer system 130 comprises computer-readable instructions 310 stored in the memory device 306, which in one embodiment includes the computer-readable instructions 310 of a resource tracking application 312, a resource transfer contract generator 313, and a machine learning engine 315. The resource transfer contract generator 313 may be configured to generate customized resource transfer contracts between one or more user devices based on details of the transfer such as the resource associated with the transfer (e.g., type of resource, amount of the resource, etc.), the parties or users involved in the transfers, and a calculated exposure score associated with the transfer. The resource transfer generator 313 may be further configured to generate one or more conditions and/or trigger events to be executed by one or more of the users associated with the resource transfer in order to successfully trigger a transfer of the resource or another process in defined by a contract protocol. In some embodiments, the resource transfer contract generator 313 may further include an exposure scoring module for calculating exposure scores associated with resource transfers and events. The resource tracking application 312 may be configured to track completion or execution of the one or more conditional events defined in a generated resource transfer to provide a record of a resource transfer progression and eventual successful delivery or failed execution by one or more of the involved parties. In some embodiments, the resource tracking application 312 may be configured to communicate with one or more third party systems or devices 140, as illustrated in FIG. 1, for tracking and confirming event execution. In one embodiment, the resource tracking application 312 may be configured to trigger a release of a held resource to one or more of the users involved in the resource transfer. The machine learning engine 315 may further comprise a natural language processing module.

In some embodiments, the memory device 306 includes data storage 308 for storing data related to the system environment, but not limited to data created and/or used by the resource tracking application 312, the resource transfer generator 313, and the machine learning engine 315. Data stored in the data storage 308 may comprise a user information database 314, and a resource storage 316, misappropriation database 318, machine learning models 320, and natural language processing module 322.

The user information database 314 is used to store information and data associated with one or more users and/or user devices as described herein. In some embodiments, the user information database 314 may include user identifying information, user account information, user interaction information (e.g., historical interactions, account actions or events, transactions, communications, inputs), user device information (e.g., device identification information, device serial numbers, digital signatures, device security tokens), exposure or misappropriation information, and the like. Resource storage 316 may include permanent or temporary storage for one or more resources associated with a resource transfer described herein, wherein the resource may be held separate from the users associated with the resource transfer.

In one embodiment of the invention, the contract-based resource transfer system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the contract-based resource transfer system 130 may include multiple systems, servers, computers or the like maintained by one or many entities. In some embodiments, the contract-based resource transfer system 130 may be part of the entity systems 120. In other embodiments, the entity systems 120 are distinct from the contract-based resource transfer system 130. The contract-based resource transfer system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110 and the contract-based resource transfer system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the contract-based resource transfer system 130 to provide access to accounts and resources stored and maintained on the entity systems 120. In some embodiments, the entity system 120 may communicate with the contract-based resource transfer system 130 during a requested interaction or resource transfer between one or more users and/or user devices in real-time, wherein user interactions or resource transfers may be monitored and tracked by the contract-based resource transfer system 130. In some embodiments, data storage 408 comprises user information database 416 and/or resource storage 420 to either supplement or replace similar data storages or databases on the contract-based resource transfer system 130 as previously discussed.

The systems of the environment 100 may be used to generate and execute customizable resource transfer contracts with event-based tracking for resource transfer security and delivery confirmation. As previously discussed, the system of the present invention is configured to generate resource transfers between users and/or devices (e.g., a peer-to-peer interaction) and define one or more conditions and events for triggering a transfer of resources, wherein the transfer is dependent upon successful execution of the one or more conditional events. The conditions and events established in the resource transfer contract generated by the system are mutually agreed upon by all parties involved in the transfer before the transfer is initiated. It should be understood that in some embodiments, the systems and methods described herein may operate as part of a peer-to-peer interaction performed between users and/or user devices (e.g., user mobile devices), wherein the system and methods modify traditional peer-to-peer interactions to include enhanced resource tracking and improved interaction security.

As used herein, a "resource transfer" may refer to any defined agreement between users for transferring or exchanging a resource along with any required conditions for permitting the transfer that have been mutually agreed upon by the users. A generated resource transfer may include all conditions and specifications of a requested transfer of resource between users. In some embodiments, a resource transfer may be an executable file generated by the system for performing a transfer or exchange of resource between users, wherein the devices of the users are controlled by the system to execute the transfer according to the agreed upon terms should the required conditions be successfully executed. The system is configured to receive the requested requirements form the users and generate the resource transfer for completing the requested interaction. Conditions or requirements associated with a resource transfer may include a type of resource (e.g., funds, data, goods, services) to be transferred or exchanged, an amount of a resource to be transferred or exchanged, resource locations or destinations for resource delivery and origination (e.g., an account or the like), physical delivery locations for resources (e.g., user devices, network locations, GPS-determined locations), and the like.

In some embodiments, conditions defined in the resource transfer may further comprise one or more events, actions, or the like to be executed by one or more of the users to complete the resource transfer. The system defines one or more conditional events in the generated resource transfer contract, wherein triggering a transfer of resources is dependent on execution of at least one conditional event. Typically, the one or more conditional events include at least one triggering event for triggering the transfer of the resource. As the conditions defined in the resource transfer must be mutually agreed upon by all users involved in the transfer, the users must also agree on any conditional events and triggering events for triggering the transfer of resources.

In some embodiments, a generated resource transfer may comprise a chain of conditional event that includes a series of events dependent on one another, wherein a failure to execute one of the events along the chain may cause the system to cancel the associated resource transfer. For example, a chain of conditional events may comprise events A, B, C, D, and E, wherein the events are required to be executed in order, and wherein event E is a triggering event for triggering a transfer of a resource. In this example, if events A and B are successfully executed, but event C is failed, the system may be configured to cancel the resource transfer before the chain reaches triggering event E. In other embodiments, the system may be configured to generate custom resource transfers and chains of conditional events, wherein more than one event in a chain must be failed before a resource transfer is canceled. In some embodiments, the system may be configured to lock a chain of conditional events after the conditions and terms of the resource transfer have been agreed upon or accepted by the users (i.e., via associated user devices) associated with the resource transfer. In this way, the system preserves the integrity of the mutually agreed upon conditions and prevents unauthorized modifications to the resource transfer after the process of the transfer has been initiated.

Non-limiting examples of conditional events and/or triggering events may include, receiving a message from one or more users or user devices (e.g., a delivery confirmation message), scanning of readable indicia (e.g., a barcode of a ticket, a tracking label of a package, etc.), capturing of an image (e.g. of a delivered package or good), determining a location of a device or resource (e.g., via GPS), or the like. In other examples, a conditional event and/or triggering event may be time-based, wherein an event is considered having been executed at a predetermined time or after a predetermined period of time has elapsed (e.g., 24 hours after the transfer was initiated, at the beginning of a play, movie, sporting event, etc.)

FIG. 5 provides a high level process flow for contract-based resource transfer generation, in accordance with one embodiment of the invention. As illustrated in block 510, the system is configured to first provide a resource transfer contract template to the first user and the second user. In the illustrated embodiment, the resource transfer contract is a for a customer peer-to-peer resource transfer. In response to receiving the initial contract template, the first user and the second user submit revisions or modifications to the contract template. Requested revisions or modifications submitted from each user are transmitted to each user device so that each user may review and agree to conditions before the contract template is modified. In one embodiment, the contract is an executable distributed protocol. The revisions or modifications may be transmitted to a server, wherein any revisions or modifications are pushed to the user devices to maintain up-to-date versions of the contract.

As illustrated in block 520, the system is configured to generate a final resource transfer contract comprising the modifications to the conditions and/or triggering events by the users. The system is configured to receive approval (e.g., user sign-off) for the final resource transfer contract from the first user and the second user. As illustrated in block 530, following approval of the resource transfer contract, the system is configured to codify the resource transfer contract into an executable file (i.e., distributed protocol), wherein the agreed upon conditions and triggering events are embedded in the executable file. The system is configured to transmit the executable file to the first user device and the second user device, wherein the executable file is installed on the user devices (e.g., in a mobile application). In some embodiments, the executable file may be installed on the user devices before finalization of the contract, wherein negotiation of a contract template my occur on the user devices.

FIG. 6 provides process diagram for an exemplary contract execution, in accordance with one embodiment of the invention. As illustrated in the exemplary executable peer-to-peer contract, a contract may comprise one or more conditions such as one or more resource amounts, resource types, resource transfer conditions, delivery conditions for resources, a time and/or location for a resource delivery, conditions for validating users and/or one or more steps of the resource transfer, security conditions (e.g., authentication), return conditions for resources, and the like. The one or more conditions are agreed upon by all involved parties and finalized. Upon the conditions and/or triggering events being completed or met, the system is configured to mark the conditions and/or triggering events as completed within the contract. In some embodiments, entries in a resource transfer contract comprise a step or event portion and a corresponding action portion, wherein the action portion of the entry is triggered upon the corresponding step or event portion being performed.

FIG. 7 provides a machine learning contract template generator system environment, in accordance with one embodiment of the invention. The system leverages artificial intelligence systems, and in particular, a machine learning engine comprising one or more models 702 for processing the data input into the system to generate contract templates. As illustrated in the embodiment of FIG. 7, the machine learning model 702 receives input from a variety of data sources including resource transfer information data 704 (e.g., resource amount, type format), user misappropriation exposure scoring data 706, resource transfer databases 708 (i.e., historical interaction data), and misappropriation claim and alert data repositories 710. The machine learning engine further comprises a natural language processing module comprising a model 714. The natural language processing model receives historical misappropriation log files 712. The machine learning model 702 also receives recent misappropriation tactics or strategies.

As previously discussed, the system further comprises an exposure scoring component. As illustrated in FIG. 7, the machine learning model outputs one or more recommended conditions and/or triggering events for scoring by the exposures scoring component 718. The exposure scoring component receives exposure threshold values 720 of the users as well as any other involved parties (e.g., third parties). As illustrated in block 722, the system analyzes exposure scores and generates an initial contract template such that a calculated exposure score for the initial contract is lower than a predetermined exposure threshold value. The contract template is output and sent to the users for negotiation and revision as discussed herein.

FIG. 8 provides a high level process flow for machine learning training and contract template generation, in accordance with one embodiment of the invention. As illustrated in block 810, data from historical resource transfers (e.g., resource amount, types, users involved, etc.) between users across all channels is input into the system. In some embodiments, the input data may further include streaming data from interactions in real-time. As previously discussed, a variety of data sources are input into the machine learning model. In block 820, the system further inputs misappropriation rates of all individual parties, a misappropriation rate for resource transfer type, a geographic location, and other factors. At block 830, the system further inputs a resource transfer type (e.g., specific resources, resource types and formats). As illustrated in block 840, the system further inputs labeled data from historical and recent misappropriation cases and tactics (e.g., from claims, alert and analyst processes, report logs etc.).

As previously discussed, in some embodiments, the system further comprises a natural language processing module. As illustrated in block 850, log files for misappropriation entries are analyzed through the natural language processing module to determine breaking points or potential failure events within a resource transfer (e.g., wrong resource delivery, no resource delivery, resource contracted to more than one other user, defective or misrepresented resource).

The machine learning model is trained using the resource transfer data, event data, user and misappropriation records, labeled data, and log files with both recent and historical entries in block 860. In block 870, the machine learning model provides prediction for the overall resource transfer in terms of misappropriation potential (i.e., exposure level scoring), and outputs key stages that require protection or confirmation for misappropriation potential (e.g., delivery confirmation). As illustrated in block 880, resulting outputs are analyzed and clustered based on main characteristics, such as exposure levels, misappropriation levels, resource transfer type, resource transfer amount, and the like. In block 890, the system generates a contract template combining the machine learning output for the resource transfer data (i.e., type, amount, users, exposure levels, etc.) with any required steps to secure the process.

FIG. 9 provides a high level process flow for contract template customization and finalization, in accordance with one embodiment of the invention. As discussed above, the system is configured to enable all involved parties to review, negotiate, and modify a contract template prior to contract finalization. The system first collects data for initial processing. In block 910, the system inputs resource transfer data (e.g., amount, type, resources involved, users, exposure levels, and the like) to the machine learning system. Additionally, each user's misappropriation record is looked up (e.g., previous misappropriation claims, etc.). In block 920, each user's individual exposure and security requirements (i.e., exposure thresholds) as well as contract complexity requirements are inputted. Next, in block 930, the machine learning model analyzes the received input entries and outputs a recommended contract template based on historical and streaming data.

As illustrated in block 940, the system provides the users (i.e., via corresponding user devices) with the contract template generated by the machine learning model to ensure the security and misappropriation potential of the overall process. In block 950, each user requests revisions or modifications to the template. Other users are notified of the requested changes via an application on the user devices.

In some embodiments, the contract includes hard and soft request positions from the users, wherein a hard position is non-negotiable, and a soft position may be negotiated or further modified. In some embodiments, a dispute regarding a hard position may trigger automatic termination of a contract. In block 960, both the hard and soft requests positions from each user are received and matched. In some embodiments, matching items from all users are automatically accepted, while non-matching items are negotiated by the users through the application and the resource transfer contract.

At block 970, if all the users are in agreement, the system continues to block 980, wherein a resulting final contract is codified into an executable file with each step agreed upon as marked as a step in the process with specific action items and any additional parties of interest (e.g., users, approvers, validators, third parties). Finally, in block 990, all users are asked to approve or sign off on the electronic peer-to-peer contract. A final version of the contract is locked and maintained by the system as a reference document to preserve immutability of the contract.

FIG. 10 provides a high level process flow for peer-to-peer resource transfer execution, in accordance with one embodiment of the invention. As illustrated in block 1010, in the event of custom peer-to-peer contract execution, each user agrees on the final contract, and the final codified contract is distributed to all involved users. At block 1020, at each step, checks are made to determine that each stage is completed or incomplete (e.g., barcode of the delivery shipment is scanned, or the like). Each completed step generates a notification for all the users involved. At block 1030, in some embodiments, users may be asked to provide supporting data for steps.

As illustrated in block 1040, when a predetermined set of steps is completed, the resources to be transferred are moved to a temporary storage location before the final execution of the transfer. The system determines whether the one or more conditional events have been executed by at least one of the users and/or user devices associated with a generated resource transfer. In order to determine whether conditional events have been executed, the system may communicate with one or more additional systems (i.e., on the back-end) to track the events. For example, the system may be configured to communicate with a package delivery tracking system to determine tracking and delivery status of a package. In other embodiments, the system may utilize an internal clock or timer for determining execution of time-based conditional events. In yet other embodiments, the system may rely on communication from one or more devices associated with a resource transfer for determining execution of one or more events, wherein the one or more devices transmit updates or event execution confirmation to the system. In one embodiment, the system may only consider an event successfully executed if all users involved in the resource transfer confirm or agree that the event was successfully executed. In some embodiments, the system may rely on communication with a third party intermediary system or device for impartial confirmation of event execution and/or resource delivery.

In order to ensure delivery of a resource and/or any other goods or services and prevent potential misappropriation, the system may be configured to hold a resource to be transferred or exchanged during the resource transfer until the conditions of the resource transfer are fulfilled or terminated. In one embodiment, wherein the resource transfer is associated with a transfer of funds, the system may be configured to receive the temporarily hold the funds until one or more conditional events are successfully executed or until the resource transfer is otherwise terminated. For example, a resource transfer between users may comprise a transfer of funds in exchange for goods. The system may be configured to impartially hold the funds on behalf of the users until any conditional events are successfully executed, or the resource transfer is otherwise terminated. In this way, the system provides an intermediary resource storage location to provide additional security to the resource transfer and prevent potential misappropriation attempts. In some embodiments, the system may further comprise a third party system or device configured to temporarily hold the resources associated with the resource transfer on behalf of the users, wherein the system is configured to trigger release of the resources from the third party in response to execution of the conditional events. In some embodiments, the third party system of device may be associated with an entity maintaining the system described herein. In other embodiments, the third party may be a separate entity contracted to hold and release the resource in response to execution of the conditions of a resource transfer generated by the system.

Alternatively, if the one or more conditions or triggering events have not been successfully executed or otherwise failed, the system may cancel the resource transfer. Upon cancellation, the system may be configured to automatically return any held resources back to a point of origination, such as an original user, user device, or resource location associated with the resource. At block 1050, in the event that steps are not agreed upon, conflict resolution aspects of the contract are activated, wherein third party input or other forms of input are sought.

As illustrated in block 1060, when all steps in the peer-to-peer contract are completed, the resource transfer is agreed as being completed and the resource is released. Based on determining successful completion of the one or more conditional events defined by the resource transfer, the system triggers the transfer of the resource based on the one or more conditional events having been successfully executed according to the conditions or criteria defined and mutually agreed upon in the resource transfer. In one embodiment, triggering transfer of the resource may comprise releasing the resource from a temporary hold by the system and/or a third party system or device to a recipient (e.g., a user resource location or user device) defined by the conditions and terms of the resource transfer. For example, in this way, a resource may be transferred from a first user device to a second user device.

In block 1070, any shadow processes such as resource releases or transfers, claim submissions, misappropriation alerts, or the like are automatically processed by the back-end of the system. At block 1080, in the event of identified misappropriation, associated users are marked in the systems with the reported claims. Corresponding misappropriation exposure scores for any following resource transfers are updated according to the learned exposure from recent and previous transfers.

FIG. 11 provides a high level process flow for natural language processing exposure event extraction, in accordance with one embodiment of the invention. Initially, at block 110, the system inputs misappropriation logs. In some embodiments, the misappropriation logs may comprise written records and/or spoken or voice records. At block 1120, for each transaction type the system is configured to process the log files with basic natural language processing steps such as tokenization, syntax, and semantic analysis. In this way, the system is configured to extract keywords associated with misappropriation and exposure tactics and strategies through machine learning and statistical correlation of expressions and the flow of keywords in the records as illustrated in block 1130.

In some embodiments, natural language processing data collected by the system may further include, but is not limited to, identified languages, dialects, grammar, syntax or sentence structure (i.e., construction, length, complexity, etc.), vocabulary, misspellings, abbreviations, word frequency patterns, slang, colloquialisms, pronunciations, vocal intonations, timbre, pitch, cadence and other similar language qualities. Natural language data may further include cognitive markers or identifiers (i.e., patterns in cognition and information delivery and receipt) and other signature markers such as mistakes or failures to perform a task (e.g., provide a password or piece of information for authentication). Natural language data may be collected across multiple communication channels including voice (e.g., via voice recognition technology), video, brick-and-mortar, and text-based channels while leveraging machine learning to generate a complete natural language record. For example, the system may collect natural language data during a user interaction with a customer support call center via a phone line, wherein the natural language system or module may be configured to extract vocal or articulated identifiers characteristic of the user in order to generate the natural language record. The natural language record data may be used by the system to identify potential misappropriation in historical and streaming interaction data.

At block 1140, the system then calculates the misappropriation exposure associated with each event E or sequence of events $E_{i-j}$. The system, at block 1150, further is configured to lookup historical resource transfer records (e.g., for both valid and invalid resource transfers) for remediation steps for potential misappropriation or exposure (e.g., third party involvement in delivery, claims rate reduction by x %). At block 1160, the system is configured to input the exposure threshold from the users involved (e.g., users and parties involved) and calculate the target exposure threshold score. At block 1170, the system calculates a total exposure including remediation steps associated with the exposable events in the potential resource transfer event flow. The event flow is iterated by the system such that the total exposure is reduced below the determined and set threshold. At block 1180, the system outputs the resulting contract template with potential resource transfer events for the calculated misappropriation exposure record.

In some embodiments, the system is configured to generate one or more conditional events, such as a chain of conditional events, for tracking the resource transfer based on the exposure score. As previously discussed, the chain of conditional events includes at least one triggering event for triggering the transfer of the resource upon execution. Based on the calculated exposure score, the system may be configured to generate the conditional events and/or triggering events. For example, in response to a high exposure score, the system may be configured to generate additional events for triggering the transfer or tracking the progress of the transfer. In one embodiment, the system may be configured to place a triggering event in the chain of conditional events based on the exposure score. For example, for a resource transfer associated with a high exposure score, the system may place a triggering event further downstream in the chain of events to increase transfer security. In another embodiment, the system may be configured to add one or more additional or interconnected triggering events required for triggering transfer of the resource in response to a high exposure score. In yet another embodiment, one or more triggering events may be required to be executed simultaneously or within a predetermined time period to trigger the transfer. Alternatively, in response to lower exposure score (e.g., for a resource transfer for a small amount or with a familiar user), the system may remove one or more conditional events or otherwise simplify the resource to reduce an amount of computing resources used to process the transfer due to a high confidence in the transfer security.

In one embodiment, the system may be configured to calculate exposure scores for individual conditional events, such as events that are chained together. For example, a first event may be associated with higher potential for exposure than a second event. In this way, the system may identify one or more individual event that has a higher chance for potential misappropriation and increase security or require additional confirmation for the one or more individual events.

In another embodiment, the system is configured to recalculate the exposure score in real-time based on execution of one or more of the conditional events executed before a final triggering event that releases the resource. In some embodiments, the system may recalculate an exposure score based on how a conditional event is executed. For example, a shipping event for a package may be executed and confirmed through a shipping entity scanning and receiving the package. The system may determine through the received scanning information that the package was shipped via a method that does not require a signature on delivery, does not include delivery insurance, does not include a tracking number, or the like. In response, the system may recalculate the exposure score for the resource transfer, wherein the exposure score may be modified (i.e., increased or decreased) based on the additional information.

In another embodiment, the system may recalculate an exposure score based on determined failure to execute one or more of the conditional events defined in the resource transfer. For example, the system may increase an exposure score based on a failed conditional event. For example, a failed conditional event may include a late or postponed shipment or delivery, a failure to provide a tracking number, a declined resource location (i.e., an account), or the like. In other embodiments, a failed conditional event, such as a triggering event, may instead automatically cancel the resource transfer.

FIG. 12 provides a high level process flow for exposure-based contract modification, in accordance with one embodiment of the invention. As illustrated in block 1210 the system calculates an overall exposure threshold for the resource transfer by incorporating the user exposure thresholds for all involved users (e.g., through a summation of the individual exposure levels). An exposure score, as calculated by the system, is a composite factor that may be input into the system to modify or enhance generated resource transfers. In some embodiments, calculation of the exposure score may be based on, for example, the resource itself (e.g. the type of resource, an amount of the resource, etc.) and/or the one or more users and associated devices participating in the resource transfer. For example, transfer of a larger amount of a resource or a transfer to an unknown user or stranger may factor into a higher calculated exposure score for a resource transfer.

At block 1220, the system provides this collected information to the machine learning module configured to generate contract templates for a resource transfer along with any additional required information (e.g., user information). At block 1230, a template is outputted and shared with the users. Each template has hard blocks that cannot be customized and soft blocks that can be customized with some limitations on customizations in some cases. At block 1240, the system receives feedback from users in terms of accepted steps and customization requests (i.e., revisions or modifications).

As illustrated in block 1250, the system analyzes the customization or modification requests and consolidates the requests to determine if the users have agreed upon a solution in block 1260. In one embodiment, at block 1265, a solution is identified by the system and the resulting contract template is output to the user devices. Alternatively, if a solution is not identified, the system continues to block 1270 where the agreed requests and requests with potential compromise possibility are input back into the machine learning model to check resulting threshold checks. If the exposure threshold is exceeded, the contract negotiation and generation process may be terminated at blocks 1275 and 1280.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of for generating and executing customizable resource transfers with contract-executed, event-based tracking for resource transfer security and delivery confirmation.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for generating and executing customizable resource transfers with contract-executed, event-based tracking for resource transfer security and delivery confirmation, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for machine learning-derived contract generation, the system comprising: a machine learning engine; and a controller configured for generating a resource transfer contract between a first user device and a second user device, wherein the resource transfer contract is for a peer-to-peer resource transfer, the controller comprising a memory device with computer-readable program code stored thereon, a communication device connected to a network, and a processing device, wherein the processing device is configured to execute the computer-readable program code to:
    input historical and streaming interaction data into the machine learning engine, wherein the machine learning engine is trained by the historical and streaming interaction data, wherein the historical and streaming interaction data comprises data associated with peer-to-peer transfers of resources at least partially executed over a peer-to-peer network;
    determine one or more machine learning-derived interaction patterns for the resource transfer between the first user device and the second user device, wherein the one or more machine learning-derived interaction patterns comprise calculated exposure levels for one or more events for completing the resource transfer;
    based on the one or more machine learning-derived interaction patterns, generate the resource transfer contract for transferring a resource from the first user device to the second user device, wherein the resource transfer contract comprises a sequential flow of the one or more events;
    transmit the resource transfer contract to the first user device and the second user device;
    receive revisions to the resource transfer contract from at least one of a first user associated with the first user device and a second user associated with the second user device;
    transmit agreed-upon conditions to the first user device and the second user device; receive approval of the resource transfer contract from the first user via the first user device and the second user via the second user device;
    generate, based on receiving the approval, a final resource transfer contract comprising the agreed-upon conditions;
    codify the final resource transfer contract comprising the agreed-upon conditions into an executable file for installation on the first user device and the second user device, wherein the executable file runs on the first user device and the second user device as a distributed peer-to-peer protocol; and
    distribute the executable file to the first user device and the second user device.

2. The system of claim 1, wherein the processing device is further configured to execute the computer-readable program code to:
    calculate an exposure level for each of the one or more events of the resource transfer contract based on the one or more machine learning-derived interaction patterns;
    identify that the exposure level for at least one of the one or more events exceeds a predetermined threshold; and
    based on the exposure level exceeding the predetermined threshold, modify the sequential flow of the one or more events, wherein modifying the sequential flow of the one or more events comprises inserting an additional security event to the sequential flow.

3. The system of claim 1, wherein the processing device is further configured to execute the computer-readable program code to:
    receive a modification to the sequential flow of the one or more events from at least one of the first user device and the second user device;
    generate a modified resource transfer contract based on the modification; and
    calculate a modified exposure level for the modified resource transfer contract, wherein the one or more events and the modification are input into the machine learning engine.

4. The system of claim 3, wherein the processing device is further configured to execute the computer-readable program code to iteratively modify the sequential flow of the one or more events until the modified exposure level is below a predetermined threshold limit.

5. The system of claim 3, wherein the processing device is further configured to execute the computer-readable program code to terminate the resource transfer contract when the modified exposure level exceeds a predetermined threshold limit.

6. The system of claim 1, wherein the historical and streaming interaction data comprises one or more of resource data, a resource transfer type, user data of a first user associated with the first user device and a second user associated with the second user device, historical resource transfer data, and historical misappropriation data.

7. The system of claim 6, wherein the historical misappropriation data further comprises previously identified misappropriation interactions and unauthorized user logs.

8. The system of claim 1, wherein the machine learning engine further comprises a natural language processing module configured to determine the one or more machine learning-derived interaction patterns for the resource transfer contract based on the historical and streaming interaction data.

9. The system of claim 1, wherein the processing device is configured to execute the computer-readable program code to, when distributing the executable file, install the executable file on the first user device and the second user device, and wherein the executable file is configured to track completion of the one or more events.

10. A computer-implemented method for machine learning-derived contract generation, the computer-implemented method comprising:
    inputting historical and streaming interaction data into a machine learning engine, wherein the machine learning engine is trained by the historical and streaming interaction data, wherein the historical and streaming interaction data comprises data associated with peer-to-peer transfers of resources at least partially executed over a peer-to-peer network;

determining one or more machine learning-derived interaction patterns for a resource transfer between a first user device and a second user device, wherein the one or more machine learning-derived interaction patterns comprise calculated exposure levels for one or more events for completing the resource transfer, and wherein the resource transfer contract is for a peer-to-peer resource transfer;

based on the one or more machine learning-derived interaction patterns, generating a resource transfer contract for transferring a resource from the first user device to the second user device, wherein the resource transfer contract comprises a sequential flow of the one or more events;

transmitting the resource transfer contract to the first user device and the second user device;

receiving revisions to the resource transfer contract from at least one of a first user associated with the first user device and a second user associated with the second user device;

transmitting agreed-upon conditions to the first user device and the second user device;

receiving approval of the resource transfer contract from the first user via the first user device and the second user via the second user device;

generating, based on receiving the approval, a final resource transfer contract comprising the agreed-upon conditions;

codifying the final resource transfer contract comprising the agreed-upon conditions into an executable file for installation on the first user device and the second user device, wherein the executable file runs on the first user device and the second user device as a distributed peer-to-peer protocol; and distributing the executable file to the first user device and the second user device.

11. The computer-implemented method of claim 10 further comprising:

calculating an exposure level for each of the one or more events of the resource transfer contract based on the one or more machine learning-derived interaction patterns;

identifying that the exposure level for at least one of the one or more events exceeds a predetermined threshold; and based on the exposure level exceeding the predetermined threshold, modifying the sequential flow of the one or more events, wherein modifying the sequential flow of the one or more events comprises inserting an additional security event to the sequential flow.

12. The computer-implemented method of claim 10 further comprising:

receiving a modification to the sequential flow of the one or more events from at least one of the first user device and the second user device;

generating a modified resource transfer contract based on the modification; and calculating a modified exposure level for the modified resource transfer contract, wherein the one or more events and the modification are input into the machine learning engine.

13. The computer-implemented method of claim 12 further comprising iteratively modifying the sequential flow of the one or more events until the modified exposure level is below a predetermined threshold limit.

14. The computer-implemented method of claim 12 further comprising terminating the resource transfer contract when the modified exposure level exceeds a predetermined threshold limit.

15. The computer-implemented method of claim 10, wherein the historical and streaming interaction data comprises one or more of resource data, a resource transfer type, user data of a first user associated with the first user device and a second user associated with the second user device, historical resource transfer data, and historical misappropriation data.

* * * * *